US012803080B2

(12) United States Patent
Singh et al.

(10) Patent No.: US 12,803,080 B2
(45) Date of Patent: Nov. 17, 2026

(54) VEHICLE BATTERY COOLING SYSTEMS

(71) Applicant: GM GLOBAL TECHNOLOGY OPERATIONS LLC, Detroit, MI (US)

(72) Inventors: Gurhari Preet Singh, Toronto (CA); Bin Li, Troy, MI (US); Rolf B. Karlsson, Grand Blanc, MI (US); Karl Bo Albert Mikkelsen, Peachland (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 763 days.

(21) Appl. No.: 18/328,883

(22) Filed: Jun. 5, 2023

(65) Prior Publication Data

US 2024/0405324 A1 Dec. 5, 2024

(51) Int. Cl.
*H01M 10/6568* (2014.01)
*B60K 11/02* (2006.01)
(Continued)

(52) U.S. Cl.
CPC ......... *H01M 10/6568* (2015.04); *B60L 58/26* (2019.02); *F04D 13/06* (2013.01);
(Continued)

(58) Field of Classification Search
CPC ........... H01M 10/6568; H01M 10/613; H01M 10/625; H01M 10/482; H01M 10/486;
(Continued)

(56) References Cited

U.S. PATENT DOCUMENTS 2,184,152 A * 12/1939 Saffir ................. B65D 81/3277 366/273
3,874,557 A * 4/1975 Porter ....................... F25D 5/02 222/146.2

FOREIGN PATENT DOCUMENTS

CN 106785192 A * 5/2017 .......... H01M 10/613
EP 2346111 A1 * 7/2011 ........ H01M 10/4235
ES 2235759 T3 * 7/2005 ......... B60H 1/00978

OTHER PUBLICATIONS

Csanyi, Edvard; Electrical Engineering Portal; "The Essentials of Pumping, Pump Speed, and Flow Rate Control that Engineers Must Know"; Mar. 13, 2023; https://electrical-engineering-portal.com/pumping-pump-speed-flow-rate-control (Year: 2023).*

(Continued)

*Primary Examiner* — Jennifer A Boyd
*Assistant Examiner* — Olivia A Jones

(57) ABSTRACT

A vehicle battery cooling system includes a coolant pump configured to supply coolant fluid to multiple battery modules, multiple adjustable flow valves each configured to selectively control a rate of coolant fluid flowing to a corresponding one of the multiple battery modules, multiple temperature sensors each configured to measure a temperature of one of the multiple battery modules, and a battery thermal control module. The battery thermal control module is configured to obtain a temperature of each of the multiple battery modules, determine whether one or more of the multiple battery modules has a temperature above a specified overheating threshold value, and change a setting of one or more of the multiple adjustable flow valves to allow a greater flow of coolant fluid to the at least one battery module exceeding the specified overheating threshold value as compared to other ones of the multiple battery modules.

18 Claims, 6 Drawing Sheets

(51) Int. Cl.
*B60L 58/26* (2019.01)
*F04D 13/06* (2006.01)
*H01M 10/48* (2006.01)
*H01M 10/613* (2014.01)
*H01M 10/625* (2014.01)

(52) U.S. Cl.
CPC ....... *H01M 10/482* (2013.01); *H01M 10/486* (2013.01); *H01M 10/613* (2015.04); *H01M 10/625* (2015.04); *B60K 11/02* (2013.01); *H01M 2220/20* (2013.01)

(58) Field of Classification Search
CPC .... H01M 2220/20; B60L 58/26; F04D 13/06; B60K 11/02
See application file for complete search history.

(56) References Cited

OTHER PUBLICATIONS

Machine Translation Relied Upon for EP-2346111-A1 (Year: 2011).*
Electromagnets (Solenoids); Eclipse Magnetics; https://www.eclipsemagnetics.com/products/magnetic-materials-and-assemblies/magnet-materials/electromagnets/ Mar. 2023 (Year: 2023).*
Machine Translation Relied Upon for CN-106785192-A (Year: 2017).*
Machine Translation Relied Upon for ES-2235759-T3 (Year: 2005).*
U.S. Appl. No. 18/312,698, filed May 5, 2023, Singh et al.

* cited by examiner

VEHICLE BATTERY COOLING SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle battery cooling systems, including endothermic solutes for rapid cooling.

Some vehicles may include multiple battery modules for powering various electrical components of the vehicle. The battery modules generate heat during operation, and may lead to dangerous or damaging operating conditions if a temperature of a battery module is too high. Vehicle cooling systems are used to reduce temperatures of the battery modules, and may include coolant pumps for circulating coolant fluid to cool the battery modules.

SUMMARY

A vehicle battery cooling system includes multiple battery modules each configured to provide power to one or more components of a vehicle, a coolant pump configured to supply coolant fluid to each of the multiple battery modules to cool the multiple battery modules, multiple adjustable flow valves each coupled between the coolant pump and a corresponding one of the multiple battery modules to selectively control a rate of coolant fluid flowing to the corresponding one of the multiple battery modules, multiple temperature sensors each configured to measure a temperature of one of the multiple battery modules associated with the temperature sensor, and a battery thermal control module. The battery thermal control module is configured to obtain, via the multiple temperature sensors, a temperature of each of the multiple battery modules, determine whether one or more of the multiple battery modules has a temperature above a specified overheating threshold value, and in response to a determination that the temperature of at least one of the multiple battery modules is above the specified overheating threshold value, change a setting of one or more of the multiple adjustable flow valves to allow a greater flow of coolant fluid to the at least one battery module exceeding the specified overheating threshold value as compared to other ones of the multiple battery modules.

In other features, the battery thermal control module is configured to increase a speed of the coolant pump in response to the determination that the temperature of at least one of the multiple battery modules is above the specified overheating threshold value.

In other features, changing a setting of one or more of the multiple adjustable flow valves includes increasing a degree of opening the adjustable flow valve corresponding to the at least one battery module exceeding the specified overheating threshold value.

In other features, changing a setting of one or more of the multiple adjustable flow valves includes increasing a degree of restriction of the adjustable flow valves corresponding to battery modules which are not exceeding the specified overheating threshold value.

In other features, the system includes a surge tank in fluid communication with the coolant pump, wherein the surge tank is configured to supply coolant fluid to the coolant pump for pumping out to the multiple battery modules.

In other features, the system includes an endothermic solute container in the surge tank, wherein the endothermic solute container is configured to house an endothermic solute and inhibit mixing of the endothermic solute with coolant fluid in the surge tank.

In other features, the battery thermal control module is configured to activate the endothermic solute container to release the endothermic solute in the surge tank, in response to a determination that the temperature of at least one of the multiple battery modules exceeds a solute release temperature threshold.

In other features, the system includes a motorized impeller in contact with the endothermic solute container, wherein the battery thermal control module is configured to activate the endothermic solute container to release the endothermic solute in the surge tank by powering the motorized impeller to break at least a portion of the endothermic solute container.

In other features, the system includes a magnet inside the endothermic solute container and a solenoid outside the endothermic solute container, wherein the battery thermal control module is configured to activate the endothermic solute container to release the endothermic solute in the surge tank by powering the solenoid to attract the magnet and break at least a portion of the endothermic solute container.

In other features, the system includes a fuse in contact with the endothermic solute container, wherein the battery thermal control module is configured to activate the endothermic solute container to release the endothermic solute in the surge tank by powering the fuse to break at least a portion of the endothermic solute container.

In other features, the system includes an inline release device in fluid communication between the coolant pump and the multiple adjustable flow valves, the inline release device including endothermic solute container.

In other features, the battery thermal control module is configured to activate the inline release device to release endothermic solute from the endothermic solute container into the coolant fluid, in response to a determination that the temperature of at least one of the multiple battery modules exceeds a solute release temperature threshold.

In other features, the inline release device includes a membrane extending between walls of the inline release device, the membrane is upstream of the endothermic solute container, and the battery thermal control module is configured to open a valve to allow a flow of coolant fluid to break the membrane and contact the endothermic solute container.

In other features, the system includes multiple inline release devices each in fluid communication between the coolant pump and a corresponding one of the multiple battery modules, wherein each of the multiple inline release devices includes an endothermic solute container.

In other features, the battery thermal control module is configured to activate the inline release device corresponding to the at least one battery module exceeding the specified overheating threshold value to release endothermic solute to mix with coolant fluid flowing to the at least one battery module exceeding the specified overheating threshold value.

A vehicle battery cooling system includes multiple battery modules each configured to provide power to one or more components of a vehicle, a coolant pump configured to supply coolant fluid to each of the multiple battery modules to cool the multiple battery modules, multiple temperature sensors each configured to measure a temperature of one of the multiple battery modules associated with the temperature sensor, an endothermic solute container configured to release an endothermic solute into the coolant fluid, and a battery thermal control module configured to obtain, via the multiple temperature sensors, a temperature of each of the multiple battery modules, determine whether one or more of the multiple battery modules has a temperature above a specified overheating threshold value, and in response to a determination that the temperature of at least one of the multiple battery modules is above the specified overheating threshold value, activate the endothermic solute container to release the endothermic solute into the coolant fluid.

In other features, the system includes a surge tank in fluid communication with the coolant pump, wherein the surge tank is configured to supply coolant fluid to the coolant pump for pumping out to the multiple battery modules, and the endothermic solute container is in the surge tank.

In other features, the system includes at least one of a motorized impeller in contact with the endothermic solute container, wherein the battery thermal control module is configured to activate the endothermic solute container to release the endothermic solute by powering the motorized impeller to break at least a portion of the endothermic solute container, a magnet inside the endothermic solute container and a solenoid outside the endothermic solute container, wherein the battery thermal control module is configured to activate the endothermic solute container to release the endothermic solute by powering the solenoid to attract the magnet and break at least a portion of the endothermic solute container, or a fuse in contact with the endothermic solute container, wherein the battery thermal control module is configured to activate the endothermic solute container to release the endothermic solute by powering the fuse to break at least a portion of the endothermic solute container.

In other features, the system includes an inline release device in fluid communication between the coolant pump and multiple adjustable flow valves each associated with a corresponding one of the multiple battery modules, wherein the inline release device includes the endothermic solute container.

In other features, the inline release device includes a membrane extending between walls of the inline release device, the membrane is upstream of the endothermic solute container, and the battery thermal control module is configured to open a valve to allow a flow of coolant fluid to break the membrane and contact the endothermic solute container.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some example embodiments described herein include vehicle battery cooling systems which increase effectiveness of emergency thermal runaway mitigation behavior for vehicle batteries, such as high voltage battery packs used in automotive propulsion applications that are thermally managed by a coolant based system. Emergency mitigation may include increasing or maximizing coolant flow through battery modules (e.g., a battery cold plate), to reduce or minimize the chance of coolant boiling.

In various implementations, a vehicle battery cooling system is configured to control flow of coolant fluid (e.g., specified vehicle coolant formulations such as DEXCOOL, water, etc.) through parallel branches of a battery cold plate via adjustable restrictors (e.g., flow valves), to concentrate coolant flow at a hottest module or hottest modules. The vehicle battery cooling system may be configured to selectively release an endothermic solute into the coolant fluid for a rapid temperature drop of the coolant fluid, in response to detecting an overheating battery module.

For example, releasing the endothermic solute in the coolant fluid causes a chemical reaction that reduces the temperature of the coolant. This may reduce a risk of vapor lock (e.g., boiling of the coolant fluid), which reduces the capability of a vehicle battery system to remove heat from the battery modules during a thermal run away event. Applying the solute may allow temperature to drop in the coolant fluid, therefore increasing the time before the thermal run away event can occur, which allows for more absorption of heat from the battery modules (e.g., battery packs, etc.).

Figure 1:
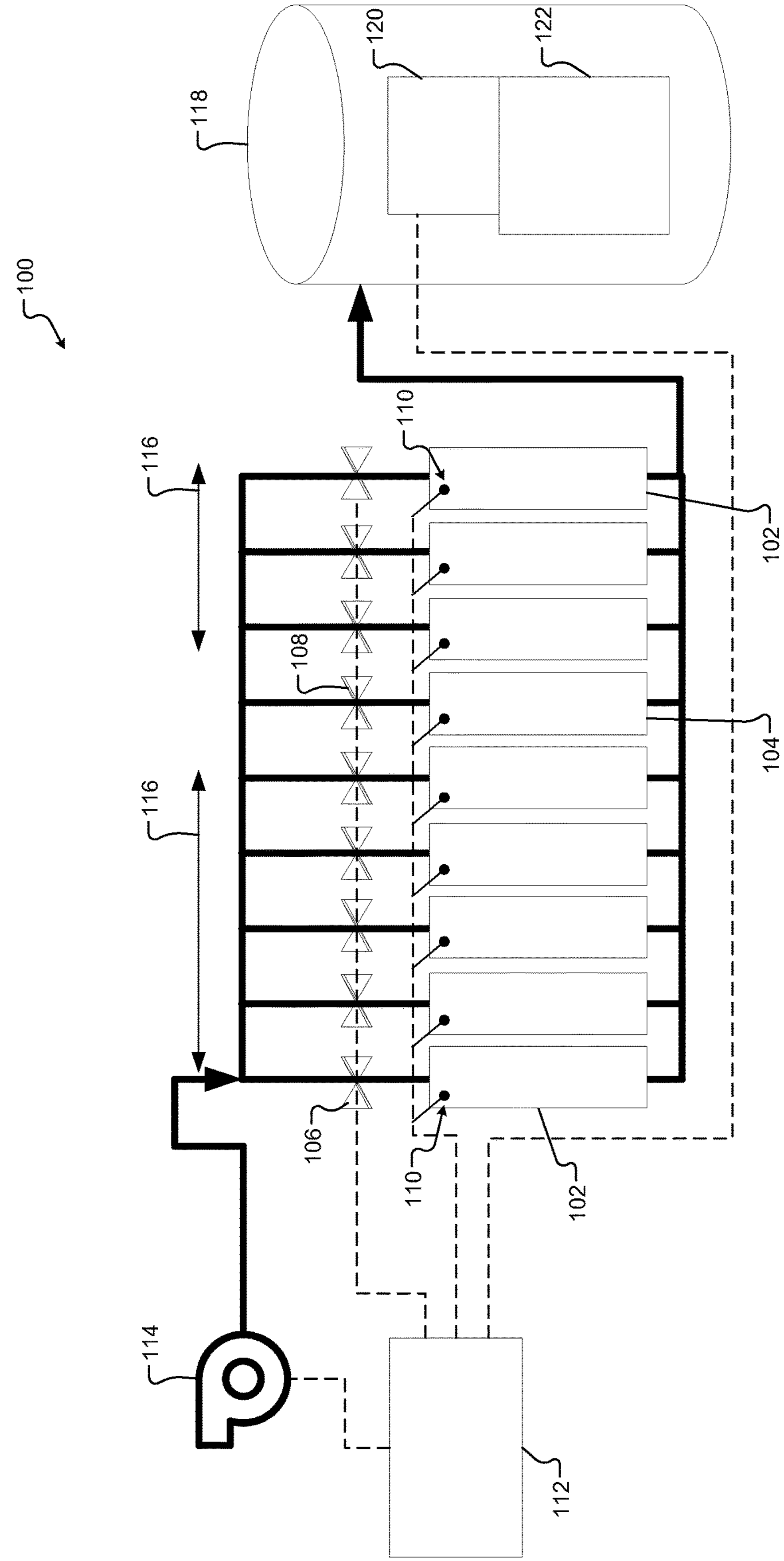
FIG. 1 is a functional block diagram of an example system for cooling battery modules of a vehicle.

FIG. 1 is a functional block diagram of an example system for cooling battery modules of a vehicle. As shown in FIG. 1, the vehicle battery cooling system 100 includes multiple battery modules 102. Each battery module 102 is configured to provide power to one or more components of a vehicle.

A coolant pump 114 is configured to supply coolant fluid to each of the multiple battery modules 102 to cool the multiple battery modules 102. For example, the coolant pump 114 may circulate coolant fluid through pipes, tubes, channels, etc., which are in contact with surfaces of the battery modules 102 or enclosures housing the battery modules 102, which pass through the battery modules 102, etc.

As shown in FIG. 1, the vehicle battery cooling system 100 includes multiple adjustable flow valves 106. Each adjustable flow valve 106 is coupled between the coolant pump 114 and a corresponding one of the multiple battery modules 102, to selectively control a rate of coolant fluid flowing to the corresponding one of the multiple battery modules 102.

Each adjustable flow valve 106 may include any suitable valve for selectively adjusting a rate of fluid flow through the valve, such as by changing valve settings regarding a degree of opening or a degree of closing or restriction of the valve.

The vehicle battery cooling system 100 includes multiple temperature sensors 110 each configured to measure a temperature of one of the multiple battery modules 102 associated with the temperature sensor 110. For example, each temperature sensor 110 may be coupled with a battery module 102, in contact with a surface of the battery module 102, located inside a housing of the battery module 102, etc.

A battery thermal control module 112 may be in electrical communication with one or more of the pump 114, the adjustable flow valves 106, the temperature sensors 110, and an actuated release mechanism 120. The battery thermal control module may be configured to obtain, via the multiple temperature sensors 110, a temperature of each of the multiple battery modules 102.

The battery thermal control module 112 is configured to determine whether one or more of the multiple battery modules 102 has a temperature above a specified overheating threshold value (e.g., a temperature threshold indicating the battery module 102 may have degraded performance, may be at risk of damage, may be at risk of a fire or burn/melt event, etc.). In response to a determination that the temperature of at least one of the multiple battery modules 102 is above the specified overheating threshold value, the battery thermal control module 112 is configured to change a setting of one or more of the multiple adjustable flow valves 106 to allow a greater flow of coolant fluid to the at least one battery module 102 exceeding the specified overheating threshold value as compared to other ones of the multiple battery modules 102.

For example, in the vehicle battery cooling system 100, the battery module 104 may be determined to have a temperature over the specified overheating threshold (e.g., when a temperature sensor 110 associated with the battery module 104 senses a temperature exceeding the specified overheating threshold). The battery thermal control module 112 may change a setting of one or more of the adjustable flow valves 106 to direct increased coolant fluid flow to the overheated battery module 104. For example, the battery thermal control module 112 may increase a degree of opening of the adjustable flow valve 108 corresponding the overheated battery module 104 (e.g., by fully opening the adjustable flow valve 108, etc.). The battery thermal control module 112 may further close or restrict the adjustable flow valves 106 corresponding to non-overheated battery modules 102 (e.g., by partially closing the adjustable flow valves 106). As a result, the set 116 of adjustable flow valves 106 may be in a position that is closed to a greater degree relative to the adjustable flow valve 108 corresponding to the overheated battery module 104, to target an increased flow of coolant fluid to the overheated battery module 104 as compared to the other non-overheated battery modules 102.

In some example embodiments, the battery thermal control module 112 may be configured to increase a speed of the coolant pump 114 in response to the determination that the temperature of at least one of the multiple battery modules 102 is above the specified overheating threshold value. For example, the battery thermal control module 112 may increase a speed of the coolant pump 114 (and/or a coolant compressor) from a current speed setting, may increase the speed to a maximum speed setting of the coolant pump 114 (and/or a coolant compressor), etc.

As shown in FIG. 1, the vehicle battery cooling system 100 may include a surge tank 118 in fluid communication with the coolant pump 114. The surge tank 118 is configured to supply coolant fluid to the coolant pump 114 for pumping out to the multiple battery modules 102. The surge tank 118 may include any suitable water tank, coolant reservoir, etc. of the vehicle.

An endothermic solute container 122 is located in the surge tank 118. The endothermic solute container 122 is configured to house an endothermic solute, and inhibit mixing of the endothermic solute with coolant fluid in the surge tank 118. The battery thermal control module 112 may be configured to activate the endothermic solute container 122 to release the endothermic solute in the surge tank 118, in response to a determination that the temperature of at least one of the multiple battery modules 102 exceeds a solute release temperature threshold.

For example, an actuated release mechanism 120 may be located in the surge tank 118 in contact with the endothermic solute container 122. Examples of various actuated release mechanisms are described further below with reference to FIGS. 5-8, such as motorized impellers, solenoids and magnets, fuses, membranes and valves for inline release devices, etc.

The endothermic solute may be any suitable material, such as ammonium nitrate, urea, etc. The endothermic solute may drop the temperature of the coolant fluid by a specified amount, such as five degrees, ten degrees, etc. In some example embodiments, a mass of the endothermic solute may be calculated by obtaining a coolant system volume, a heat capacity of the coolant fluid, and a temperature drop needed for a specified thermal runaway mitigation benefit.

The system may calculate a thermal energy to be extracted from the system, an enthalpy of solution for the endothermic solute, moles of the endothermic solute needed to dissolve to extract the specified thermal energy from the coolant fluid, a molar mass of the endothermic solute, and a mass of the endothermic needed to dissolve to extract the specified thermal energy from the coolant fluid. In some example embodiments, the endothermic solute may include at least five hundred grams of ammonium nitrate.

Figure 2:
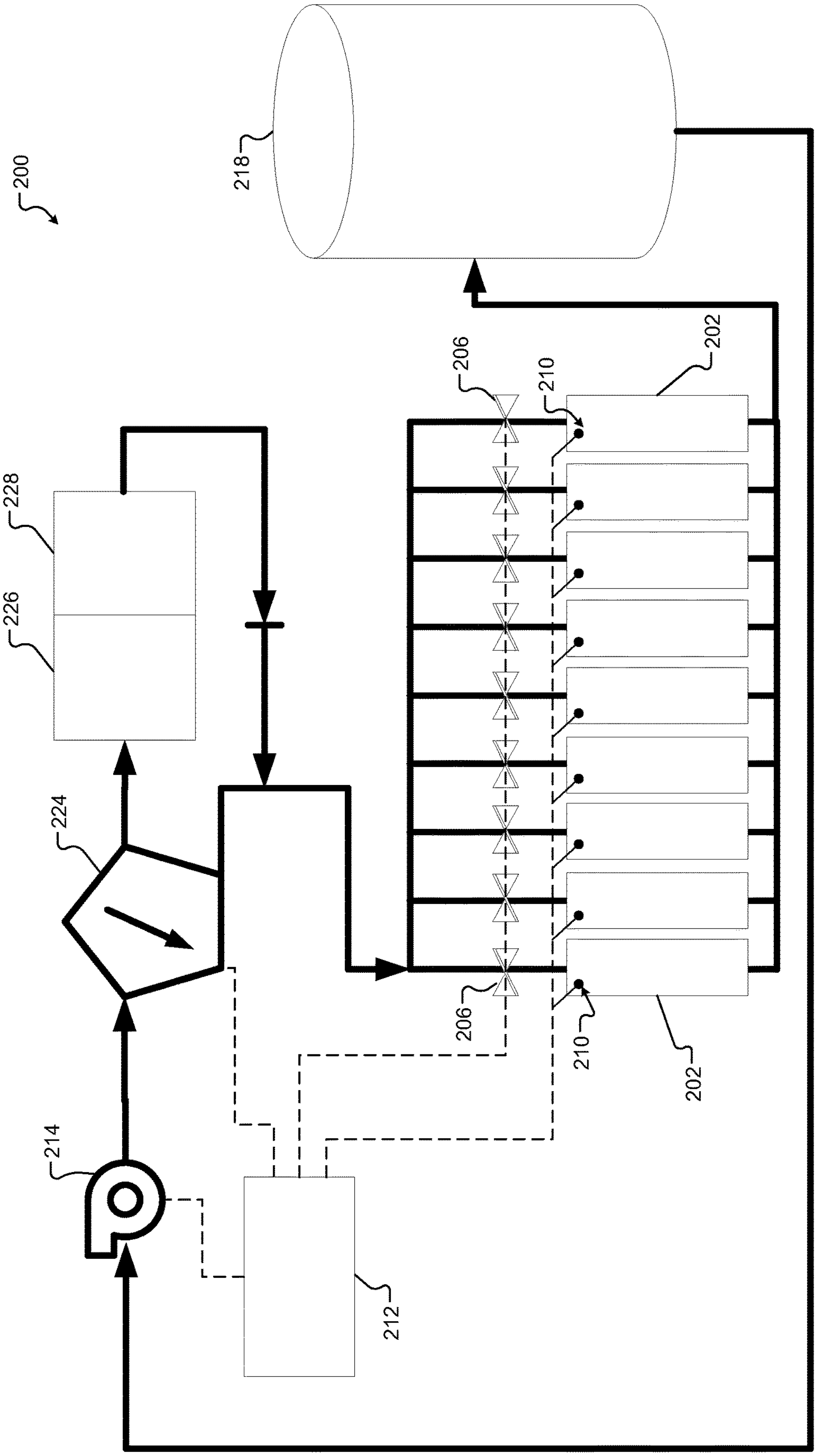
FIG. 2 is a functional block diagram of an example system for cooling battery modules of a vehicle, including an endothermic solute.

FIG. 2 is a functional block diagram of an example system for cooling battery modules of a vehicle, including an endothermic solute. As shown in FIG. 2, the vehicle battery cooling system 200 includes multiple battery modules 202. Each battery module 202 is configured to provide power to one or more components of a vehicle.

A coolant pump 214 is configured to supply coolant fluid to each of the multiple battery modules 202 to cool the multiple battery modules 202. For example, the coolant pump 214 may circulate coolant fluid through pipes, tubes, channels, etc., which are in contact with surfaces of the battery modules 202 or enclosures housing the battery modules 202, which pass through the battery modules 202, etc.

As shown in FIG. 2, the vehicle battery cooling system 200 includes multiple adjustable flow valves 206. Each adjustable flow valve 206 is coupled between the coolant pump 214 and a corresponding one of the multiple battery modules 202, to selectively control a rate of coolant fluid flowing to the corresponding one of the multiple battery modules 202.

The vehicle battery cooling system 200 includes multiple temperature sensors 210 each configured to measure a temperature of one of the multiple battery modules 202 associated with the temperature sensor 210. For example, each temperature sensor 210 may be coupled with a battery module 202, in contact with a surface of the battery module 202, located inside a housing of the battery module 202, etc.

As shown in FIG. 2, the vehicle battery cooling system 200 may include a surge tank 218 in fluid communication with the coolant pump 214. The surge tank 218 is configured to supply coolant fluid to the coolant pump 214 for pumping out to the multiple battery modules 202. The surge tank 218 may include any suitable water tank, coolant reservoir, etc. of the vehicle.

An electronically controlled valve 224 may be in fluid communication between the pump 214 and the adjustable flow valves 206. As shown in FIG. 2, the electronically controlled valve 224 is also in fluid communication between the pump 214 and an inline release mechanism 226 and an endothermic solute container 228. The endothermic solute container 228 may house an endothermic solute, and inhibit mixing of the endothermic solute with coolant fluid until the inline release mechanism 226 is activated. For example, the electronically controlled valve 224 may selectively direct a flow of coolant fluid directly to the adjustable flow valves 206, or may allow the coolant fluid to pass though the inline release mechanism 226 and the endothermic solute container 228, to mix the coolant fluid with the endothermic solute. An example of the inline release mechanism is described further below with reference to FIG. 8.

A battery thermal control module 212 may be in electrical communication with one or more of the pump 214, the adjustable flow valves 206, the temperature sensors 210, and the electronically controlled valve 224. The battery thermal control module 212 may be configured to obtain, via the multiple temperature sensors 210, a temperature of each of the multiple battery modules 202.

The battery thermal control module 212 is configured to determine whether one or more of the multiple battery modules 202 has a temperature above a specified overheating threshold value (e.g., a temperature threshold indicating the battery module 202 may have degraded performance, may be at risk of damage, may be at risk of a fire or burn/melt event, etc.). In response to a determination that the temperature of at least one of the multiple battery modules 202 is above the specified overheating threshold value, the battery thermal control module 212 is configured to activate the inline release mechanism 226, such as by controlling the electronically controlled valve 224 to direct coolant fluid flow through the inline release mechanism 226. This may result in mixing of the coolant fluid with endothermic solute in the endothermic solute container 228, to lower a temperature of the coolant fluid.

Figure 8:
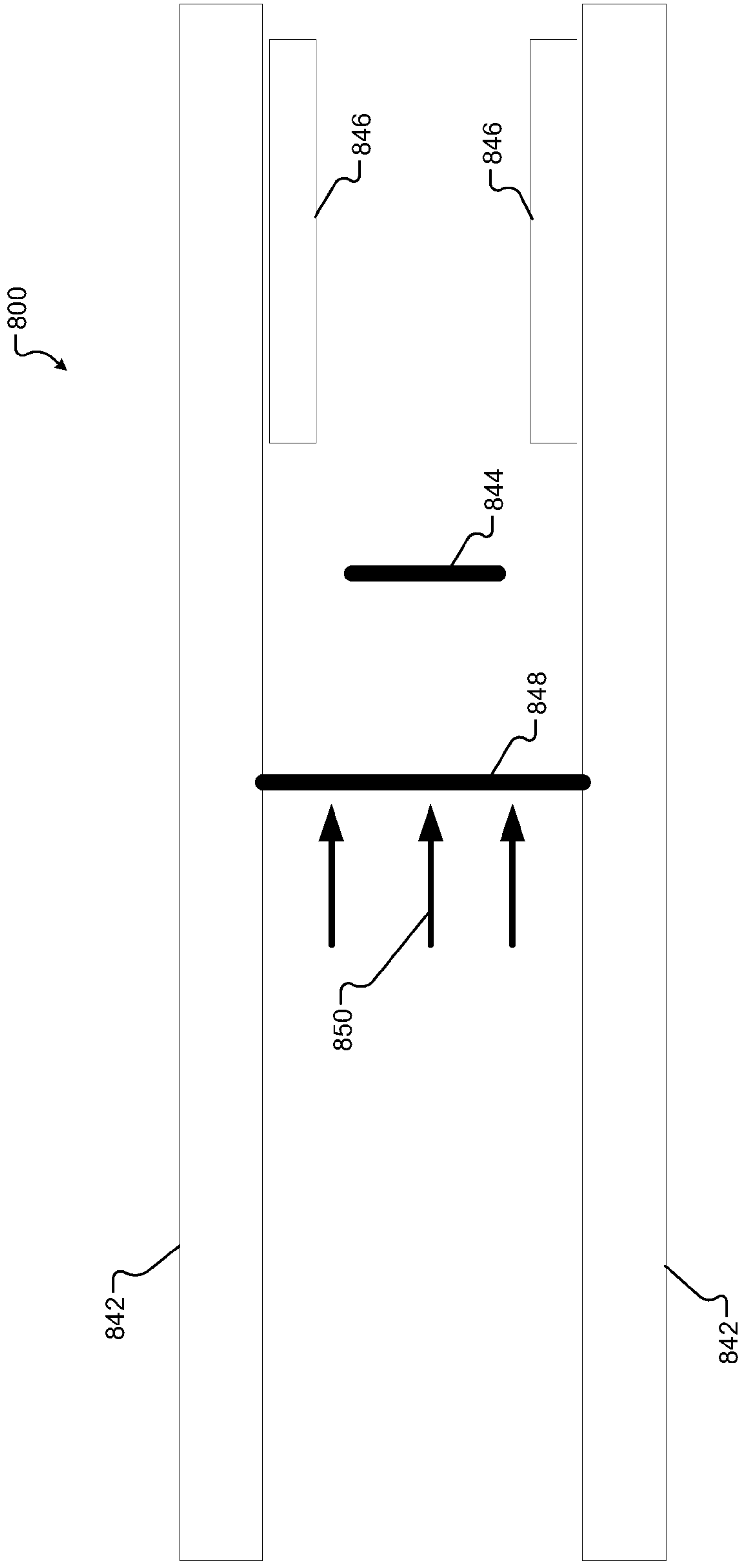
FIG. 8 is a functional block diagram of an example tank including an-inline device for releasing an endothermic solute.

In some example embodiments, the inline release mechanism 226 includes a membrane extending between walls of the inline release device 226 (e.g., as shown in FIG. 8 and described further below). The membrane is upstream of the endothermic solute container 228. The battery thermal control module 212 is configured to open the electronically controlled valve 224 to allow a flow of coolant fluid to break the membrane and contact the endothermic solute container 228.

Figure 3:
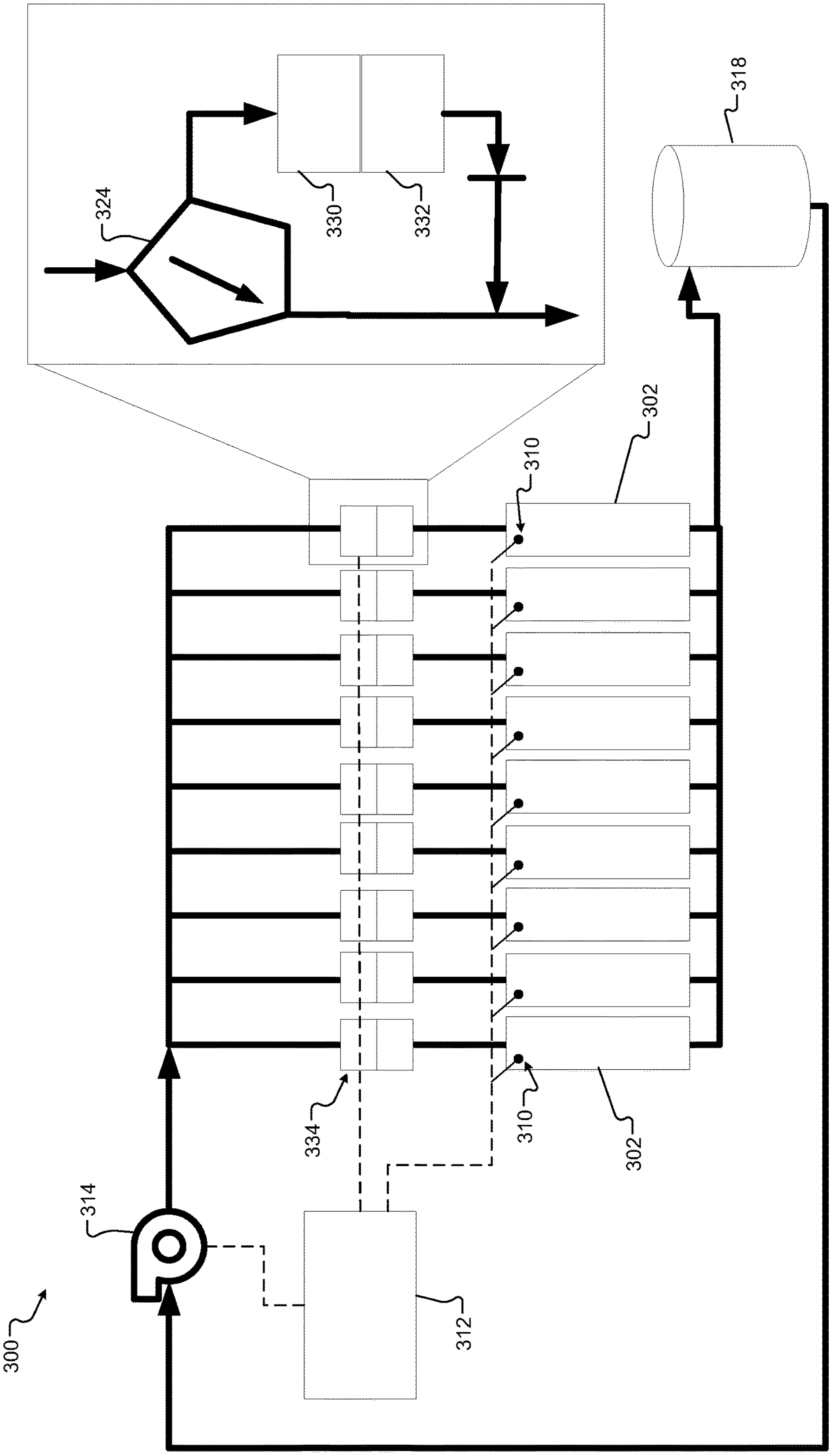
FIG. 3 is a functional block diagram of an example system for cooling battery modules of a vehicle, including individual in-line release mechanisms.

FIG. 3 is a functional block diagram of an example system for cooling battery modules of a vehicle, including individual in-line release mechanisms. As shown in FIG. 3, the vehicle battery cooling system 300 includes multiple battery modules 302. Each battery module 302 is configured to provide power to one or more components of a vehicle.

A coolant pump 314 is configured to supply coolant fluid to each of the multiple battery modules 302 to cool the multiple battery modules 302. For example, the coolant pump 314 may circulate coolant fluid through pipes, tubes, channels, etc., which are in contact with surfaces of the battery modules 302 or enclosures housing the battery modules 302, which pass through the battery modules 302, etc.

The vehicle battery cooling system 300 shown in FIG. 3 may include multiple adjustable flow valves (not illustrated in FIG. 3). Each adjustable flow valve is coupled between the coolant pump 314 and a corresponding one of the multiple battery modules 302, to selectively control a rate of coolant fluid flowing to the corresponding one of the multiple battery modules 302.

The vehicle battery cooling system 300 includes multiple temperature sensors 310 each configured to measure a temperature of one of the multiple battery modules 302 associated with the temperature sensor 310. For example, each temperature sensor 310 may be coupled with a battery module 302, in contact with a surface of the battery module 302, located inside a housing of the battery module 302, etc.

As shown in FIG. 3, the vehicle battery cooling system 300 may include a surge tank 318 in fluid communication with the coolant pump 314. The surge tank 318 is configured to supply coolant fluid to the coolant pump 314 for pumping out to the multiple battery modules 302. The surge tank 318 may include any suitable water tank, coolant reservoir, etc. of the vehicle.

The vehicle battery cooling system 300 includes multiple inline release devices 334. Each inline release device 334 is in fluid communication between the coolant pump 314 and a corresponding one of the multiple battery modules 302. Each inline release device 334 includes an electronically controlled valve 324, an inline release mechanism 330, and an endothermic solute container 332.

Each electronically controlled valve 324 may selectively direct a flow of coolant fluid directly to battery module 302 corresponding to the inline release device 334 which includes the electronically controlled valve 324, or may allow the coolant fluid to pass though the inline release mechanism 330 and the endothermic solute container 332 to mix the coolant fluid with the endothermic solute. This allows for directing coolant fluid which has been mixed with endothermic solute to a specific overheating battery module 302. An example of the inline release mechanism is described further below with reference to FIG. 8.

A battery thermal control module 312 may be in electrical communication with one or more of the pump 314, the temperature sensors 310, and the electronically controlled valve 324. The battery thermal control module 312 may be configured to obtain, via the multiple temperature sensors 310, a temperature of each of the multiple battery modules 302.

The battery thermal control module 312 is configured to determine whether one or more of the multiple battery modules 302 has a temperature above a specified overheating threshold value (e.g., a temperature threshold indicating the battery module 302 may have degraded performance, may be at risk of damage, may be at risk of a fire or burn/melt event, etc.). In response to a determination that the temperature of at least one of the multiple battery modules 302 is above the specified overheating threshold value, the battery thermal control module 312 is configured to activate the inline release device 334 corresponding to the at least one battery module 302 exceeding the specified overheating threshold value, to release endothermic solute 332 to mix with coolant fluid flowing to the at least one battery module 302 exceeding the specified overheating threshold value.

In some example embodiments, the inline release mechanism 330 includes a membrane extending between walls of the inline release device 334 (e.g., as shown in FIG. 8 and described further below). The membrane is upstream of the endothermic solute container 332. The battery thermal control module 312 is configured to open the electronically controlled valve 324 to allow a flow of coolant fluid to break the membrane and contact the endothermic solute container 332.

In some example embodiments, a vehicle battery cooling system may combine features including the selective adjustable flow valves for targeting increased coolant fluid flow to overheating modules, releasing endothermic solute in a surge tank, releasing endothermic solute in a general inline release mechanism for the overall system, releasing endothermic solute in one or more of multiple inline release mechanisms each corresponding to a different battery module, etc.

Figure 4:
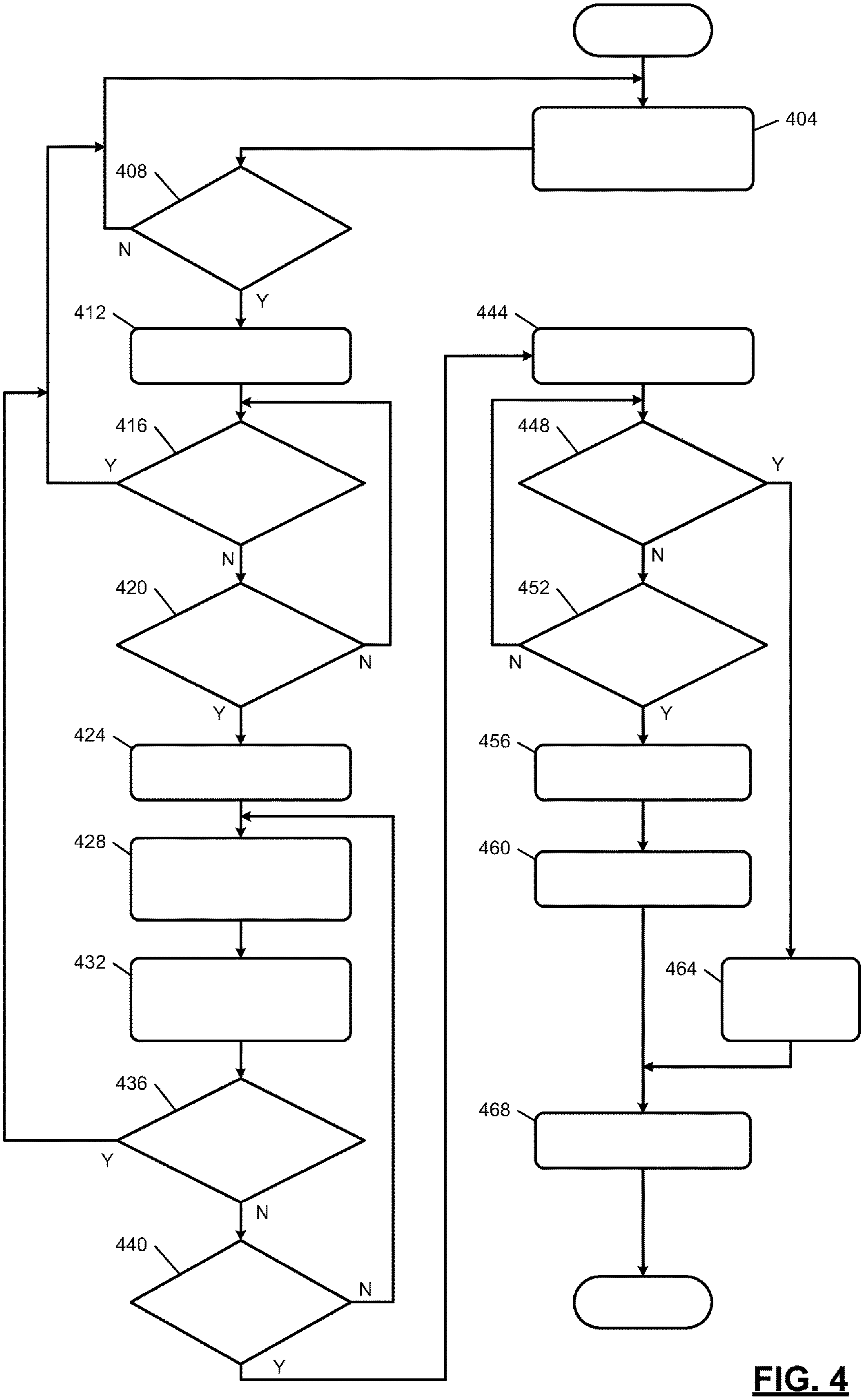
FIG. 4 is a flowchart depicting an example method of controlling a vehicle battery cooling system.

FIG. 4 is a flowchart depicting an example method of controlling a vehicle battery cooling system. The method may be performed by, for example, the battery thermal control module 112 of FIG. 1, the battery thermal control module 212 of FIG. 2, or the battery thermal control module 312 of FIG. 3.

At 404, the battery thermal control module is configured to monitor battery module temperature conditions. For example, the battery thermal control module may be configured to obtain sensed temperature values of each of the battery modules 102 via the temperature sensors 110. The sensed temperatures may be direct temperatures of one or more components of a battery module 102, a temperature inside a battery module 102, a temperature adjacent a battery module 102, etc.

At 408, the battery thermal control module is configured to compare the obtained temperature values to a specified temperature threshold value, such as a level 1 temperature threshold. The battery thermal control module may compare each battery module temperature threshold to the threshold, to determine whether one or more individual battery modules exceed the temperature threshold. The temperature threshold may be indicative of a temperature at which battery operation may degrade, where a risk of fire is elevated, where a risk of damage to the battery is elevated, etc.

If none of the battery module temperatures are above the threshold value at 408, control returns to 404 to continue monitoring battery module temperatures. In some example embodiments, battery module temperatures may be monitored on a periodic basis.

If control detects at least one battery module having a temperature above the threshold at 408, control proceeds to 412 to increase a speed of a coolant pump and/or compressor. Increasing the speed may cause the coolant fluid to flow through the battery modules at a faster rate, thereby increasing cooling effects. The compressor speed (and/or refrigerant valve opening) may lower temperature of the coolant delivered to the battery modules.

The battery thermal control module is configured to determine at 416 whether the battery module temperature(s) have been mitigated. For example, control may determine whether the battery module that was previously overheating has lowered back down to an acceptable temperature below the threshold. If so, control returns to 404 to continue monitoring temperatures of the batteries.

If the battery thermal control module determines at 416 that the battery overheating temperature has not been mitigated based on the increased speed of the coolant pump and/or compressor, control determines at 420 whether the temperature of the overheating battery module(s) exceeds, e.g., a level 2 temperature threshold. The level 2 temperature threshold may be the same as the level 1 temperature threshold at 408, or may be greater than the level 1 temperature threshold.

For example, in some embodiments the level 1 temperature threshold may indicate a low level of overheating where increased coolant flow alone may be capable of reducing battery module temperatures. The level 2 temperature threshold may be higher to indicate that the battery module temperature has reached a more dangerous level where additional procedures beyond general system coolant flow increases should be implemented. In other example embodiments, the level 2 temperature threshold may be the same as the level 1 temperature threshold, indicating that the system will move on to further protection procedures if the increased general coolant flow does not lower the temperature of the overheating battery module(s) (e.g., within a specified time period, etc.).

If the battery thermal control module determines at 420 that the level 2 temperature is exceeded for at least one battery module, the battery thermal control module is configured to set the speed of the coolant pump and/or compressor to a maximum value. This increases the flow of the coolant in the system to a maximum rate, to increase cooling effects on the battery modules.

At 428, the battery thermal control module is configured to identify specific impacted battery modules, such as one or more specific battery modules that are experiencing a temperature above the level 2 threshold. An example is the overheating battery module 104 in FIG. 1.

Control then restricts coolant flow to the non-impacted battery modules at 432, which increases coolant flow to the overheating battery module(s). For example, the battery control module 112 may further close or restrict the adjustable flow valves 106 in FIG. 1 which are associated with the battery modules 102 that are not overheating, while further opening the adjustable flow valve 108 associated with the overheating battery module 104. In various implementations, the battery control module may only further open the adjustable flow valve 108 associated with the overheating battery module 104, may only further close or restrict the adjustable flow valves 106 which are associated with the battery modules 102 that are not overheating, may adjust all of the valves 106 and 108 in combination, etc.

At 436, the battery thermal control module is configured to determine whether the battery temperature overheating condition has been mitigated by selectively increasing coolant flow to the overheating battery module(s) via adjustments to the flow valve(s). If so, control returns to 404 to continue monitoring battery module temperature conditions.

If the battery thermal control module determines at 436 that the battery overheating temperature has not been mitigated based on the increased coolant flow to the specific overheating battery module(s), control determines at 440 whether the temperature of the overheating battery module(s) exceeds, e.g., a level 3 temperature threshold. The level 3 temperature threshold may be the same as the level 2 temperature threshold at 420, or may be greater than the level 2 temperature threshold.

For example, in some embodiments the level 2 temperature threshold may indicate a medium level of overheating, where focusing the increased coolant flow specifically on overheating battery modules via adjustable flow valves may be capable of reducing battery module temperatures. The level 3 temperature threshold may be higher to indicate that the battery module temperature has reached a further dangerous level where additional procedures beyond targeted coolant flow increases should be implemented to avoid serious battery module risks. In other example embodiments, the level 3 temperature threshold may be the same as the level 2 temperature threshold, indicating that the system will move on to further protection procedures if the targeted coolant flow increase does not lower the temperature of the overheating battery module(s) (e.g., within a specified time period, etc.).

If the temperature threshold is not exceeded at 440, control returns to 428 to identify specific impacted battery modules that are experiencing overheating conditions. In this manner, the battery thermal control module may continuously reevaluate which battery modules are experiencing overheating conditions, and redistribute coolant flow to currently overheating batteries by continuing to adjust settings of the adjustable flow valves to selectively increase coolant fluid flow to the battery modules that are experiencing overheating conditions.

If the temperature threshold is exceeded at 440, control proceeds to 444 to activate release of endothermic solute into the coolant fluid from an endothermic solute container, such as the endothermic solute container 122 of FIG. 1, the endothermic solute container 228 of FIG. 2, or the endothermic solute container 332 of FIG. 3. The endothermic solute may reduce a temperature of the coolant fluid, thereby increasing cooling effects on the overheating battery module(s).

At 448, control determines whether the battery module temperature is mitigated. If so, control proceeds to 464 to disable the vehicle after a predetermined time or a key cycle count. For example, if endothermic solute is released to control the battery temperature overheating condition, the system may allow the user to continue driving the vehicle to a destination, but then request service of the vehicle at 468 to take care of the endothermic solute that is now present in the coolant fluid, to check a safety condition of the overheating battery module(s), etc.

If the battery thermal control module determines at 448 that the battery overheating temperature has not been mitigated based on the increased coolant flow to the specific overheating battery module(s), control determines at 452 whether the temperature of the overheating battery module(s) exceeds, e.g., a level 4 temperature threshold. The level 4 temperature threshold may be the same as the level 3 temperature threshold at 440, or may be greater than the level 3 temperature threshold.

For example, in some embodiments the level 3 temperature threshold may indicate a high level of overheating where releasing an endothermic solute may be capable of reducing battery module temperatures. The level 4 temperature threshold may be an even higher level indicating that the battery module temperature shut down immediately due to dangerous conditions. In other example embodiments, the level 4 temperature threshold may be the same as the level 3 temperature threshold, indicating that the system will move on to shutdown protection procedures if the endothermic solute release does not lower the temperature of the overheating battery module(s) (e.g., within a specified time period, etc.).

If the temperature threshold is exceeded at 456 for at least one of the battery modules, control proceeds to 456 to shutdown the vehicle and then calls first responders at 460. For example, the threshold at 452 may indicate that a battery fire is a high risk, or may have already started, so the vehicle should be shutdown immediately and first responders contacted for safety. Control then proceeds to 468 to request service or disposal of the vehicle, due to the fact that one or more battery modules or other portions of the vehicle may be damaged due to the high temperature, a possible fire or burning/melting event, etc.

In other example embodiments, the endothermic solute release and targeted coolant flow via adjustable flow valves may be used at the same time or based on a same threshold, the battery temperature protection features may be used in a different order or may be based on more or less temperature thresholds, etc.

Figure 5:
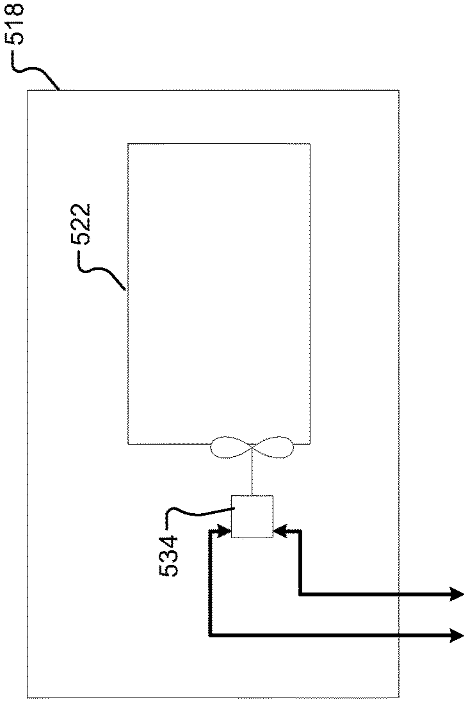
FIG. 5 is a functional block diagram of an example tank including a motorized impeller for releasing an endothermic solute.

FIG. 5 is a functional block diagram of an example tank including a motorized impeller for releasing an endothermic solute. The tank 518 may be a water tank, a surge tank, a coolant fluid tank, etc., and may be in fluid communication with a coolant pump to supply coolant fluid for circulation to battery modules.

As shown in FIG. 5, an endothermic solute container 522 is inside the tank 518. The endothermic solute container 522 may house an endothermic solute, and may inhibit mixing of the endothermic solute with coolant fluid in the tank 518 until the endothermic solute container 522 is activated.

For example, a motorized impeller 534 is in contact with a side of the endothermic solute container 522. The endothermic solute container 522 may be a soft sided container, such that when the battery thermal control module selectively energizes the motorized impeller 534, blades of the motorized impeller 534 rotate to break a side of the endothermic solute container 522 to release the endothermic solute for mixing with coolant fluid.

Figure 6:
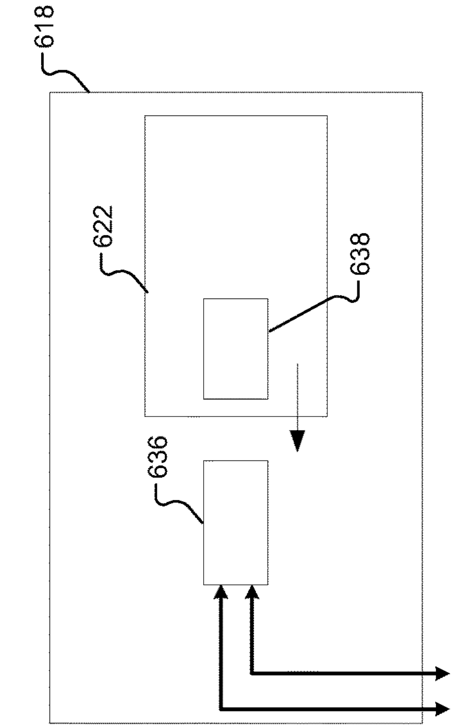
FIG. 6 is a functional block diagram of an example tank including a solenoid and magnet for releasing an endothermic solute.

FIG. 6 is a functional block diagram of an example tank including a solenoid and magnet for releasing an endothermic solute. The tank 618 may be a water tank, a surge tank, a coolant fluid tank, etc., and may be in fluid communication with a coolant pump to supply coolant fluid for circulation to battery modules.

As shown in FIG. 6, an endothermic solute container 622 is inside the tank 618. The endothermic solute container 622 may house an endothermic solute, and may inhibit mixing of the endothermic solute with coolant fluid in the tank 618 until the endothermic solute container 622 is activated.

For example, a magnet 638 may be located inside the endothermic solute container 622, and a solenoid may be located outside of the endothermic solute container 622. The endothermic solute container 622 may be a soft sided container, such that when the battery thermal control module selectively energizes the solenoid 636, the magnet 638 is attracted towards the solenoid 636 (or repelled away from the solenoid 636) to break a side of the endothermic solute container 622 to release the endothermic solute for mixing with coolant fluid.

Figure 7:
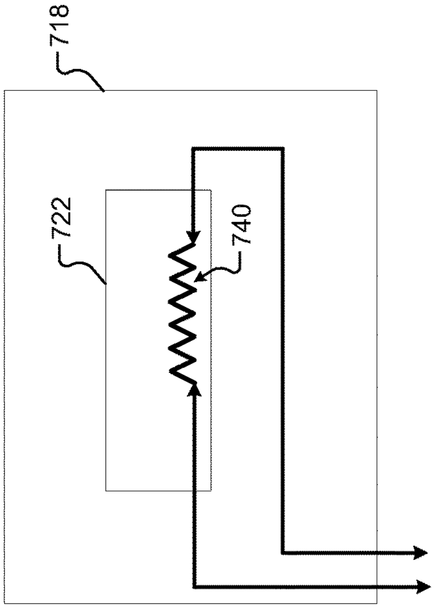
FIG. 7 is a functional block diagram of an example tank including a fuse for releasing an endothermic solute.

FIG. 7 is a functional block diagram of an example tank including a fuse for releasing an endothermic solute. The tank 718 may be a water tank, a surge tank, a coolant fluid tank, etc., and may be in fluid communication with a coolant pump to supply coolant fluid for circulation to battery modules.

As shown in FIG. 7, an endothermic solute container 722 is inside the tank 718. The endothermic solute container 722 may house an endothermic solute, and may inhibit mixing of the endothermic solute with coolant fluid in the tank 718 until the endothermic solute container 722 is activated.

For example, a fuse 740 (e.g., an electronic fuse, thermal fuse, a resistive fuse, etc.) is in contact with a side of the endothermic solute container 722. The endothermic solute container 722 may be a soft sided container, such that when the battery thermal control module selectively energizes the fuse 740, the fuse 740 heats up to melt or break a side of the endothermic solute container 722 to release the endothermic solute for mixing with coolant fluid.

FIG. 8 is a functional block diagram of an example tank including an-inline device for releasing an endothermic solute. The inline release device 800 may be in fluid communication between a coolant pump and multiple adjustable flow valves, such as the coolant pump 114 and the adjustable flow valves 106 of FIG. 1. The inline release device 800 includes at least one endothermic solute container 846, which may be an endothermic solute mass. As used herein, an endothermic solute container may refer to an endothermic solute housed within a walled structure, an endothermic solute mass in a stable form that maintains its shape until mixed with coolant fluid, etc.

The battery thermal control module may be configured to activate the inline release device 800 to release the endothermic solute 846 into the coolant fluid, in response to a determination that the temperature of at least one battery module exceeds a solute release temperature threshold.

As shown in FIG. 8, the inline release device 800 includes a membrane 848 extending between walls 842 of the inline release device 800. For example, the inline release device 800 may be a pipe, valve, etc. having side walls 842. The membrane 848 may be a material configured to seal a portion of the inline release device 800 housing the endothermic solute 846, such as a material stretching across a full diameter of the inline release device 800, a material which inhibits coolant fluid from passing through the membrane 848 until the membrane 848 is broken, etc.

The membrane 848 is upstream of the endothermic solute 846. The battery thermal control module is configured to allow a flow of coolant fluid 850 to break the membrane 848, such as by opening a valve upstream of the membrane 848, etc. The coolant fluid may then contact and mix with the endothermic solute 846 to reduce a temperature of the coolant fluid. A turbulence plate 844 may be configured to provide turbulence to a flow of the coolant fluid, to increase a degree of mixing of the coolant fluid with the endothermic solute 846.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle battery cooling system comprising:

multiple battery modules each configured to provide power to one or more components of a vehicle;

a coolant pump configured to supply coolant fluid to each of the multiple battery modules to cool the multiple battery modules;

multiple adjustable flow valves each coupled between the coolant pump and a corresponding one of the multiple battery modules to selectively control a rate of coolant fluid flowing to the corresponding one of the multiple battery modules;

multiple temperature sensors each configured to measure a temperature of one of the multiple battery modules associated with the temperature sensor;

an inline release device in fluid communication between the coolant pump and the multiple adjustable flow valves, the inline release device including an endothermic solute container; and a battery thermal control module configured to, obtain, via the multiple temperature sensors, a temperature of each of the multiple battery modules;

determine whether one or more of the multiple battery modules has a temperature above a specified overheating threshold value; and in response to a determination that the temperature of at least one of the multiple battery modules is above the specified overheating threshold value, change a setting of one or more of the multiple adjustable flow valves to allow a greater flow of coolant fluid to the at least one battery module exceeding the specified overheating threshold value as compared to other ones of the multiple battery modules.

2. The vehicle battery cooling system of claim 1, wherein the battery thermal control module is configured to increase a speed of the coolant pump in response to the determination that the temperature of at least one of the multiple battery modules is above the specified overheating threshold value.

3. The vehicle battery cooling system of claim 1, wherein changing a setting of one or more of the multiple adjustable flow valves includes increasing a degree of opening the adjustable flow valve corresponding to the at least one battery module exceeding the specified overheating threshold value.

4. The vehicle battery cooling system of claim 3, wherein changing a setting of one or more of the multiple adjustable flow valves includes increasing a degree of restriction of the adjustable flow valves corresponding to battery modules which are not exceeding the specified overheating threshold value.

5. The vehicle battery cooling system of claim 1, further comprising a surge tank in fluid communication with the coolant pump, wherein the surge tank is configured to supply coolant fluid to the coolant pump for pumping out to the multiple battery modules.

6. The vehicle battery cooling system of claim 5, further comprising a second endothermic solute container in the surge tank, wherein the second endothermic solute container is configured to house an endothermic solute and inhibit mixing of the endothermic solute with coolant fluid in the surge tank.

7. The vehicle battery cooling system of claim 6, wherein the battery thermal control module is configured to activate the second endothermic solute container to release the endothermic solute in the surge tank, in response to a determination that the temperature of at least one of the multiple battery modules exceeds a solute release temperature threshold.

8. The vehicle battery cooling system of claim 7, further comprising a motorized impeller in contact with the second endothermic solute container, wherein the battery thermal control module is configured to activate the second endothermic solute container to release the endothermic solute in the surge tank by powering the motorized impeller to break at least a portion of the endothermic solute container.

9. The vehicle battery cooling system of claim 7, further comprising a magnet inside the second endothermic solute container and a solenoid outside the second endothermic solute container, wherein the battery thermal control module is configured to activate the second endothermic solute container to release the endothermic solute in the surge tank by powering the solenoid to attract the magnet and break at least a portion of the second endothermic solute container.

10. The vehicle battery cooling system of claim 7, further comprising a fuse in contact with the second endothermic solute container, wherein the battery thermal control module is configured to activate the second endothermic solute container to release the endothermic solute in the surge tank by powering the fuse to break at least a portion of the second endothermic solute container.

11. The vehicle battery cooling system of claim 1, wherein the battery thermal control module is configured to activate the inline release device to release endothermic solute from the endothermic solute container into the coolant fluid, in response to a determination that the temperature of at least one of the multiple battery modules exceeds a solute release temperature threshold.

12. The vehicle battery cooling system of claim 11, wherein:
- the inline release device includes a membrane extending between walls of the inline release device;
- the membrane is upstream of the endothermic solute container; and
- the battery thermal control module is configured to open a valve to allow a flow of coolant fluid to break the membrane and contact the endothermic solute container.

13. A vehicle battery cooling system comprising:
- multiple battery modules each configured to provide power to one or more components of a vehicle;
- a coolant pump configured to supply coolant fluid to each of the multiple battery modules to cool the multiple battery modules;
- multiple adjustable flow valves each coupled between the coolant pump and a corresponding one of the multiple battery modules to selectively control a rate of coolant fluid flowing to the corresponding one of the multiple battery modules;
- multiple temperature sensors each configured to measure a temperature of one of the multiple battery modules associated with the temperature sensor;
- multiple inline release devices each in fluid communication between the coolant pump and a corresponding one of the multiple battery modules, wherein each of the multiple inline release devices includes an endothermic solute container; and
- a battery thermal control module configured to,
  - obtain, via the multiple temperature sensors, a temperature of each of the multiple battery modules;
  - determine whether one or more of the multiple battery modules has a temperature above a specified overheating threshold value; and
- in response to a determination that the temperature of at least one of the multiple battery modules is above the specified overheating threshold value, change a setting of one or more of the multiple adjustable flow valves to allow a greater flow of coolant fluid to the at least one battery module exceeding the specified overheating threshold value as compared to other ones of the multiple battery modules.

14. The vehicle battery cooling system of claim 13, wherein the battery thermal control module is configured to activate the inline release device corresponding to the at least one battery module exceeding the specified overheating threshold value to release endothermic solute to mix with coolant fluid flowing to the at least one battery module exceeding the specified overheating threshold value.

15. A vehicle battery cooling system comprising:
- multiple battery modules each configured to provide power to one or more components of a vehicle;
- a coolant pump configured to supply coolant fluid to each of the multiple battery modules to cool the multiple battery modules;
- multiple temperature sensors each configured to measure a temperature of one of the multiple battery modules associated with the temperature sensor;
- an endothermic solute container configured to release an endothermic solute into the coolant fluid;
- an inline release device in fluid communication between the coolant pump and multiple adjustable flow valves each associated with a corresponding one of the multiple battery modules, wherein the inline release device includes the endothermic solute container; and
- a battery thermal control module configured to,
  - obtain, via the multiple temperature sensors, a temperature of each of the multiple battery modules;
  - determine whether one or more of the multiple battery modules has a temperature above a specified overheating threshold value; and
  - in response to a determination that the temperature of at least one of the multiple battery modules is above the specified overheating threshold value, activate the endothermic solute container to release the endothermic solute into the coolant fluid.

16. The vehicle battery cooling system of claim 15, further comprising a surge tank in fluid communication with the coolant pump, wherein:
- the surge tank is configured to supply coolant fluid to the coolant pump for pumping out to the multiple battery modules; and
- a second endothermic solute container is in the surge tank.

17. The vehicle battery cooling system of claim 15, further comprising at least one of:
- a motorized impeller in contact with the endothermic solute container, wherein the battery thermal control module is configured to activate the endothermic solute container to release the endothermic solute by powering the motorized impeller to break at least a portion of the endothermic solute container;
- a magnet inside the endothermic solute container and a solenoid outside the endothermic solute container, wherein the battery thermal control module is configured to activate the endothermic solute container to release the endothermic solute by powering the solenoid to attract the magnet and break at least a portion of the endothermic solute container; or
- a fuse in contact with the endothermic solute container, wherein the battery thermal control module is configured to activate the endothermic solute container to release the endothermic solute by powering the fuse to break at least a portion of the endothermic solute container.

18. The vehicle battery cooling system of claim 15, wherein:
- the inline release device includes a membrane extending between walls of the inline release device;
- the membrane is upstream of the endothermic solute container; and
- the battery thermal control module is configured to open a valve to allow a flow of coolant fluid to break the membrane and contact the endothermic solute container.

* * * * *